United States Patent
Lu et al.

(10) Patent No.: US 12,026,581 B2
(45) Date of Patent: Jul. 2, 2024

(54) WEARABLE SCANNER

(71) Applicants: GREE ELECTRIC APPLIANCES, INC. OF ZHUHAI, Zhuhai (CN); LEAYUN TECHNOLOGY CO., LTD. OF ZHUHAI, Zhuhai (CN)

(72) Inventors: Jianyao Lu, Zhuhai (CN); Yang Ge, Zhuhai (CN); Yuqin Cao, Zhuhai (CN); Jiahua Liu, Zhuhai (CN); Changfeng Liu, Zhuhai (CN); Anfu Zeng, Zhuhai (CN)

(73) Assignees: GREE ELECTRIC APPLIANCES, INC. OF ZHUHAI, Guangdong (CN); LEAYUN TECHNOLOGY CO., LTD. OF ZHUHAI, Guangdong (CN)

( * ) Notice: Subject to any disclaimer, the term of this patent is extended or adjusted under 35 U.S.C. 154(b) by 0 days.

(21) Appl. No.: 18/005,320

(22) PCT Filed: Aug. 13, 2021

(86) PCT No.: PCT/CN2021/112556
§ 371 (c)(1),
(2) Date: Jan. 12, 2023

(87) PCT Pub. No.: WO2022/105319
PCT Pub. Date: May 27, 2022

(65) Prior Publication Data
US 2023/0259729 A1    Aug. 17, 2023

(30) Foreign Application Priority Data
Nov. 17, 2020    (CN) .......................... 202011284854.9

(51) Int. Cl.
*G06K 7/10*      (2006.01)

(52) U.S. Cl.
CPC .................... *G06K 7/10891* (2013.01); *G06K 2007/10534* (2013.01)

(58) Field of Classification Search
CPC ..... G06K 7/10891; G06K 2007/10534; G06K 7/10821
See application file for complete search history.

(56) References Cited

U.S. PATENT DOCUMENTS 3,496,719 A    2/1970    Zaltron
2009/0168612 A1    7/2009    Robin et al.
(Continued)

FOREIGN PATENT DOCUMENTS

CN    101094601 A    12/2007
CN    204544667 U    8/2015
(Continued)

OTHER PUBLICATIONS

G. Li, G. Gao, J. Bao, B. Yi, C. Song and L. -a. Bian, "A Watch Strap Antenna for the Applications of Wearable Systems," in IEEE Access, vol. 5, pp. 10332-10338, 2017, doi: 10.1109/ACCESS.2017.2715186. (Year: 2017).*

(Continued)

*Primary Examiner* — Matthew Mikels
(74) *Attorney, Agent, or Firm* — Armstrong Teasdale LLP (57) ABSTRACT

Some embodiments of the present disclosure provide a wearable scanner. The wearable scanner includes: a scanner body and a wearable portion. A wearing space for a user to wear is formed between the scanner body and the wearable portion; the wearable portion includes at least one adjusting section configured for adjusting a length of the wearable portion; the adjusting section includes a plurality of hole structures that are disposed in a circumferential direction of the wearable portion, and a plurality of air-permeable grooves formed by hole walls of the hole structures in a (Continued)

matching manner are provided on a surface of the adjusting section facing the wearing space.

19 Claims, 5 Drawing Sheets

(56) References Cited

U.S. PATENT DOCUMENTS

| | | | |
|---|---|---|---|
| 2012/0159987 | A1 | 6/2012 | Walchle et al. |
| 2016/0058162 | A1* | 3/2016 | Wang .................. H04B 1/3888 224/219 |
| 2017/0286729 | A1* | 10/2017 | AlNasser .............. G06F 1/1686 |

FOREIGN PATENT DOCUMENTS

| | | | |
|---|---|---|---|
| CN | 204721350 | U | 10/2015 |
| CN | 106020475 | A | 10/2016 |
| CN | 206043657 | U | 3/2017 |
| CN | 206557789 | U | 10/2017 |
| CN | 108932445 | A | 12/2018 |
| CN | 110169626 | A | 8/2019 |
| CN | 110448013 | A | 11/2019 |
| CN | 110973776 | A | 4/2020 |
| CN | 211264316 | U | 8/2020 |
| JP | 2016144614 | A | 8/2016 |

OTHER PUBLICATIONS

IEEE document (Year: 2017).*
International Search Report for Corresponding International App. No. PCT/CN2021/112556, mailed Sep. 28, 2021, 3 pages.
Search Report dated Nov. 21, 2021 for corresponding Chinese application 202011284854.9.

* cited by examiner

WEARABLE SCANNER

CROSS-REFERENCE TO RELATED APPLICATION

The present application is a National Stage Entry of International Patent Application No. PCT/CN2021/112556, filed on Aug. 13, 2021, which claims priority to Chinese patent application No. 202011284854.9 filed on Nov. 17, 2020 and entitled "Wearable Scanner," the disclosure of which are hereby incorporated by reference in their entirety.

TECHNICAL FIELD

The disclosure relates to a technical field of scanners, in particular to a wearable scanner.

BACKGROUND

With a development of society, bar codes such as one-dimensional codes and two-dimensional codes are increasingly applied to daily life. When a conventional bar code scanner is operated, one hand is required to hold an object, and the other hand is required to hold the scanner for scanning. The scanning mode is complicated, and a scanning efficiency is not high. Based thereon, a wearable scanner small in size is used.

However, when the wearable scanner is worn, a wearable portion needs to be frequently put on and off, consequently, damage is easily caused. Meanwhile, as the wearable portion attaches to a surface of the skin for a long time, the skin at a wearing position of a user has difficulty sweating, which brings poor experience to users.

SUMMARY

Embodiments of the disclosure provide a wearable scanner, by changing structural design, the overall service life of the scanner can be prolonged, and the air permeability of a wearable portion can be enhanced, thus promoting the use experience of a user.

In some embodiments, the wearable scanner includes: a scanner body and a wearable portion, and a wearing space for a user to wear is formed between the scanner body and the wearable portion; the wearable portion includes at least one adjusting section used for adjusting the length of a wearable portion; and the adjusting section includes a plurality of hole structures that are disposed in the circumferential direction of the wearable portion, and a plurality of air-permeable grooves formed by hole walls of the plurality of hole structures in a matching manner are provided on a surface of the adjusting section facing the wearing space.

In the abovementioned wearable scanner, the wearable scanner includes the scanner body and the wearable portion. When the user performs a wearing operation of the wearable scanner, the hole structures in the adjusting section deform to extend the length of whole adjusting section, thereby enabling the wearing space to fit various sizes. It is to be noted that in the process of adjusting the length of the adjusting section, mainly the hole structures are subjected to structural deformation, the deformation of a material of the wearable portion can be effectively prevented, and thus the service life can be prolonged. When the user wears the wearable scanner for scanning the like, the air-permeable grooves formed by side walls of the plurality of hole structures in a matching manner on an inner surface of the adjusting section can promote the air permeability of the skin at a wearing position and reduce the discomfort of sweating, thereby promoting the use experience of the user.

Therefore, for the wearable scanner, by changing structural design, the overall service life of the scanner can be prolonged, and the air permeability of the wearable portion can be enhanced, thus promoting the use experience of the user.

In some embodiments, the plurality of hole structures are disposed inside the adjusting section, and each of the plurality of hole structures is through hole penetrating through the adjusting section.

In some embodiments, each of the plurality of hole structures is a polygonal hole, and in the length direction of the wearable portion, vertex angles of adjacent polygons are oppositely disposed.

In some embodiments, in a thickness direction of the adjusting section, a size of each of the plurality of hole structures is at least half of a thickness of the adjusting section.

In some embodiments, the wearing portion further includes a contact section which is configured to contact a body of the user, one side, facing the scanner body, of the contact section is provided with a contact surface, and the contact surface is matched with a radian of the body at the wearing position of the user.

In some embodiments, the contact section is provided with an adjusting hole which deforms when the wearable portion is stressed, and a length direction of a cross section of the adjusting hole is the same as that of the wearable portion.

In some embodiments, the contact section is provided with only one adjusting hole, and in a length direction of the contact section, a size of the adjusting hole occupies at least two thirds of the length of the contact section.

In some embodiments, the scanner body is connected with the wearable portion through a key groove structure.

One of the scanner body and the wearable portion is provided with two connecting portions oppositely disposed, and each of the two connecting portions is provided with a sliding groove.

The other of the scanner body and the wearable portion is provided with two sliding rails in one-to-one correspondence with the sliding grooves.

In some embodiments, each sliding groove is provided with a limiting surface configured to limit the maximum displacement position of a corresponding sliding rail.

In some embodiments, each sliding groove is provided with a guide section convenient for a corresponding sliding rail to slide in.

In some embodiments, the wearable portion is provided with an abutment platform having an abutment plane for abutment with an end face of one side, facing the wearable portion, of a corresponding connecting portion.

In some embodiments, the wearable portion includes two adjusting sections disposed on opposite sides of the contact section, and each of the two adjusting sections connects the contact section with the abutment platform.

In some embodiments, a side, facing the wearable portion, of the scanner body is provided with an arc-shaped surface which is matched with the radian at the wearing position of the user; and the wearing space is formed between the arc-shaped surface and the wearable portion.

In some embodiments, the wearable portion is made of an elastic material.

BRIEF DESCRIPTION OF THE DRAWINGS

In order to describe the technical solutions in the embodiments of the disclosure more clearly, the drawings required to be used in descriptions about the embodiments will be simply introduced below, obviously, the drawings described below are only some embodiments of the disclosure, and other drawings may further be obtained by those of ordinary skill in the art according to the drawings without creative work.

DESCRIPTION OF REFERENCE NUMERALS 1. scanner body; 11. sliding groove; 12. arc-shaped surface; 2. wearable portion; 21. hole structure; 22. air-permeable groove; 23. contact surface; 24. adjusting hole; 25. sliding rail; 26. abutment platform; L. circumferential direction; R. arc direction; 10, connecting portion 101. limiting surface; 102. guide section; 201. adjusting section; 202. contact section; 203. connecting section; and 261. abutment plane.

DETAILED DESCRIPTION OF THE EMBODIMENTS

In order to make the purposes, features and advantages of the disclosure become more apparent and easier to understand, the specific implementation modes of the disclosure will be described in detail below in combination with the drawings. Numerous specific details are set forth in the following description to provide a thorough understanding of the disclosure. However, the disclosure can be implemented in many other ways than those described herein, and those skilled in the art can make similar modifications without departing from the contents of the disclosure, and therefore the disclosure is not limited by the specific embodiments disclosed below.

Figure 1:
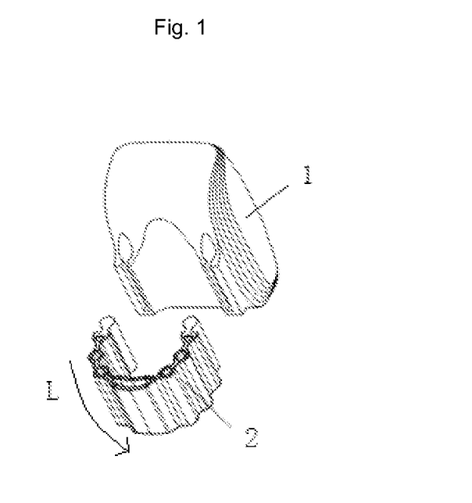
FIG. 1 illustrates a schematic structural diagram of a wearable scanner provided by an embodiment of the disclosure.
Figure 2:
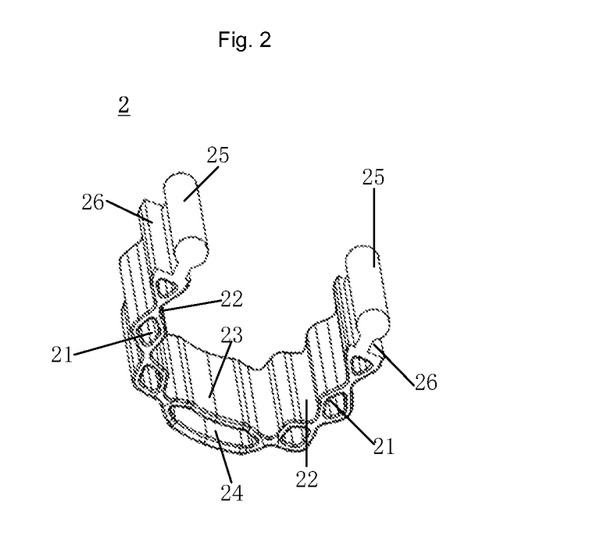
FIG. 2 illustrates a schematic structural diagram of a wearable portion in FIG. 1.

Referring to FIG. 1 and FIG. 2, some embodiments of the present disclosure provide a wearable scanner, which includes a scanner body 1 and a wearable portion 2. A wearing space for a user to wear is formed between the scanner body 1 and the wearable portion 2. The wearable portion 2 includes at least one adjusting section 201 configured for adjusting a length of the wearable portion 2. The adjusting section 201 includes a plurality of hole structures 21 that are disposed in a circumferential direction (namely, direction L in FIG. 1) of the wearable portion 2. Exemplarily, each of the plurality of hole structures 21 is a polygonal hole, such as a diamond hole, a rectangular hole, a triangular hole or a hexagonal hole; or, the hole structure 21 is a circular hole, an elliptical hole, or another shape. A plurality of air-permeable grooves 22 formed by hole walls of the hole structures 21 in a matching manner are provided on a surface of the adjusting section facing the wearing space. The length of the wearable portion 2 refers to a length between two ends connecting the wearable portion 2 and the scanner body 1, and lengths of the adjusting section and the contact section of the wearable portion 2 refers to a size in the length direction of the wearable portion 2.

When the user performs a wearing operation of the wearable scanner, the hole structures 21 in the adjusting section deform to extend the length of whole adjusting section, thereby enabling the wearing space to fit various sizes. The change of the length of the adjusting section is mainly realized through deformation of the hole structures 21, so that stretching or compression deformation of the material of the wearable portion can be effectively prevented, and the service life can be prolonged. When the user wears the wearable scanner, due to the hole structures 21, the surface, facing the wearing space, of the adjusting section is serrated, and the side walls of the hole structures 21 are matched to form the air-permeable grooves 22. The air-permeable grooves 22 can promote the air permeability of the skin at a wearing position and reduce the discomfort of sweating, thereby promoting the use experience of the user.

Therefore, for the wearable scanner, by changing structural design, the overall service life of the scanner can be prolonged, and the air permeability of the wearable portion 2 can be enhanced, thus promoting the use experience of the user.

The wearable portion 2 can be configured for wearing at the finger or the wrist. For example, the wearable portion 2 is worn at the finger, when the finger of the user stretches into the wearing space formed between the scanner body 1 and the wearable portion 2, the hole structures 21 in the adjusting section 201 deform to extend the length of whole adjusting section 201, thereby enabling the wearing space to fit fingers of various sizes. It should be understood that the deformation of the hole structures is more comfortable for the user than the stretching or compression deformation of the material itself, and thus the user will not feel strong pressure when wearing the wearable scanner.

The plurality of hole structures 21 extend in the width direction of the wearable portion 2, being arranged in parallel and spaced apart from each other. The width of the wearable portion 2 is perpendicular to the length of the wearable portion 2. The plurality of hole structures 21 are disposed inside the adjusting section and are through holes penetrating through the adjusting section. The portion between the outer surface of the adjusting section 201 and the hole structure 21 is the hole wall, so that deformation more easily occurs due to stress. In an embodiment, the hole structure 21 is a polygonal hole, such as a diamond hole. In the length direction of the wearable portion 2, the vertex angles of adjacent polygonal holes are oppositely disposed, so that deformation more easily occurs due to stress.

In some embodiments, in a thickness direction of the adjusting section, a size of each of the plurality of hole structure 21 is at least half of a thickness of the adjusting section, so that deformation more easily occurs due to stress.

Figure 3:
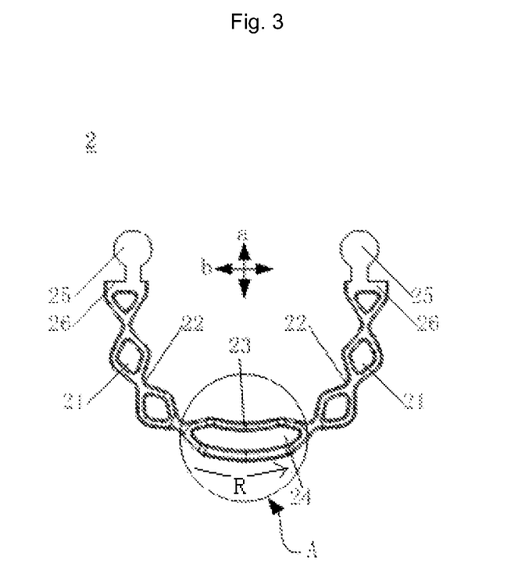
FIG. 3 illustrates another schematic structural diagram of a wearable portion in FIG. 1.

On the basis of the abovementioned technical solution, as shown in FIG. 2 and FIG. 3, for example, the wearable portion 2 is worn at the finger, the wearing portion 2 further includes a contact section 202 which is configured to contact the inner surface of the finger, and one side, facing the scanner body 1, of the contact section 202, is provided with a contact surface 23. In an embodiment, the contact surface 23 can be provided to be matched with a radian of the inner surface of the finger, so that the comfort during wear of the user can be enhanced.

When the wearable portion 2 deforms due to stress, the contact surface 23 increases the contact area between the finger and the wearable portion 2, so that the product is worn on the hand more securely and seldom falls off.

Figure 4:
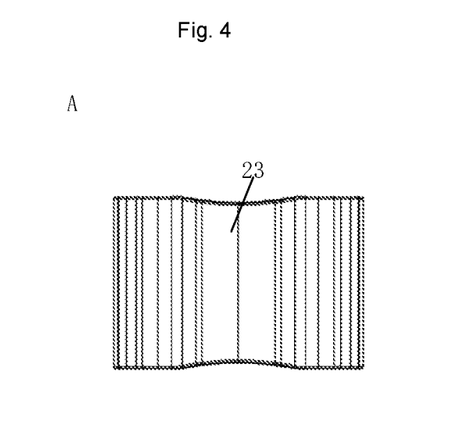
FIG. 4 illustrates an enlarged schematic diagram of A in FIG. 3.

In some embodiments, as shown in FIG. 3 and FIG. 4, the contact surface 23 is specifically an arc-shaped surface 12 of large curvature. It should be understood that because the finger will often bend during use of the wearable scanner, the contact surface 23 will continue to bend with the finger, and the contact surface 23, which is provided as the arc-shaped surface of large curvature, can effectively prolong the service life of the wearable portion 2.

In some embodiments, in order to further promote the comfort during wear of the user, the contact section is provided with an adjusting hole 24 which deforms when the wearable portion 2 is stressed, and a length direction of a cross section of the adjusting hole 24 is the same as that of the wearable portion 2. When the wearable portion 2 is stressed, the aperture of the adjusting hole 24 changes. In an embodiment, the contact section 202 is provided with only one adjusting hole 24. In a length direction of the contact section 202, a size of the adjusting hole 24 occupies at least two thirds of a length of the contact section 202.

In some embodiments, when the wearable scanner is worn on the finger, the wearable portion 2 is in a stretched state, in such a case, the adjusting hole 24 is stressed to narrow along the thickness direction (namely, direction a in FIG. 3) of the contact section 202, and stressed to be lengthened in the length direction (namely, direction b in FIG. 3) of the contact section 202. It is to be understood that in the change process of the adjusting hole 24, the force exerted by the wearable portion 2 on the finger of the user will be reduced, so that the comfort can be enhanced.

In some embodiments, the scanner body 1 and the wearable portion 2 are detachably connected. The detachable connection structure facilitates assembly and detachment operations between the wearable portion 2 and the scanner body 1. Meanwhile, the detachable connection structure makes it possible to manufacture the scanner body 1 and the wearable portion 2 separately, so that manufacturing difficulties can be reduced and the production process can be optimized.

In some embodiments, the material of a shell of the scanner body 1 is plastic. The material of the wearable portion 2 is an elastic material such as a silicone material or a rubber material, specifically formed directly in one piece by means of a mould. The method of forming the wearable portion 2 in one piece by using the mould can reduce the difficulty of the production process, so that the wearable portion 2 is suitable for batch production.

In addition, since the wearable portion 2 is a consumable article during use process of the wearable scanner, a damaged wearable portion 2 can be detached from the scanner body 1 to be replaced with a new wearable portion 2. Therefore, the wearable scanner provided by the embodiment of the disclosure can reduce the replacement cost.

Figure 5:
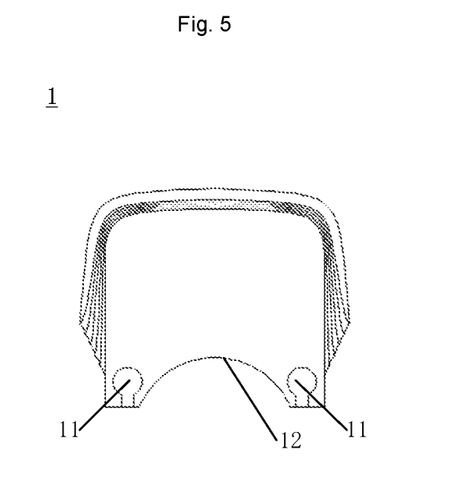
FIG. 5 illustrates a schematic structural diagram of a scanner body in FIG. 1.
Figure 6:
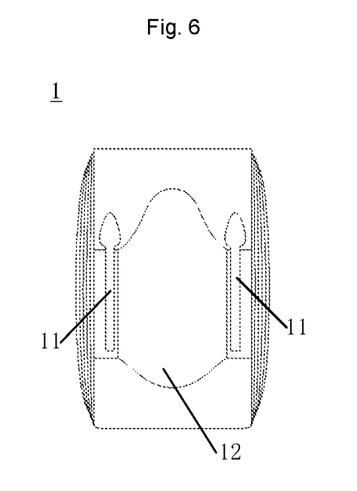
FIG. 6 illustrates another schematic structural diagram of a scanner body in FIG. 1.

As an optional implementation mode, the scanner body 1 is connected with the wearable portion 2 through a key groove structure. As shown in FIG. 5 and FIG. 6, the scanner body 1 is provided with two connecting portions 10 oppositely disposed, and each of the two connecting portions 10 is provided with a sliding groove 11. As shown in FIG. 2 and FIG. 3, the wearable portion 2 is provided with two sliding rails 25 in one-to-one correspondence with sliding grooves 11 of the two connecting portions.

It is to be understood that the key groove structure between the scanner body 1 and wearable portion 2 is not limited to the above-described structure, it is also possible to provide the sliding grooves 11 on the wearable portion 2 and the sliding rails 25 on the scanner body 1, as desired, and no elaboration will be made herein.

Figure 7A:
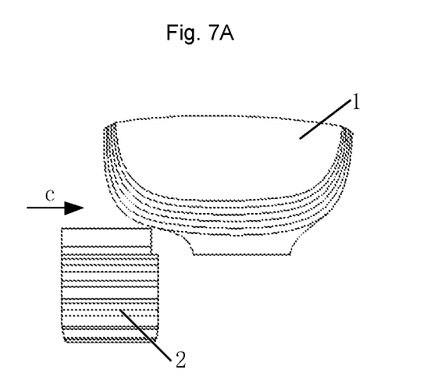
FIGS. 7A-7C illustrate schematic structural diagrams of assembly of a wearable scanner provided by an embodiment of the disclosure.
Figure 7B:
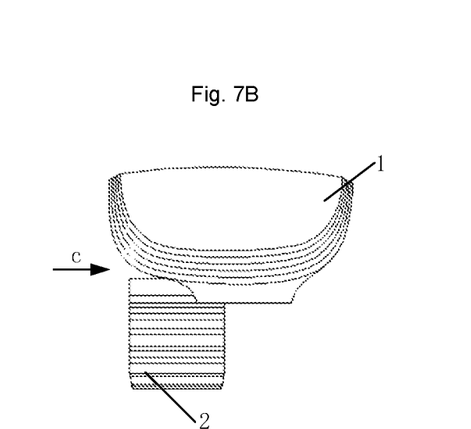
Figure 7C:
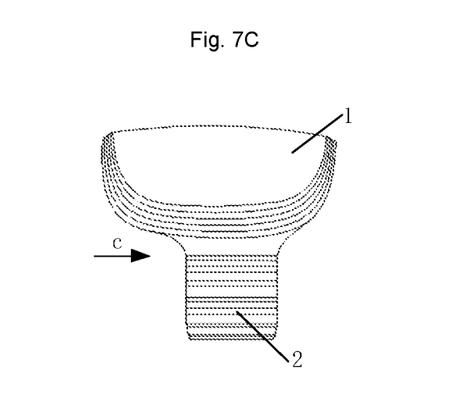

In some embodiments, in order to prevent the sliding rail 25 from excessively moving out from the other end of the sliding groove 11 after entering the sliding groove 11 from one end of the sliding groove 11 in the direction c during the installation process of the wearable portion 2 and the scanner body 1 as shown in FIGS. 7A to 7C, as an optional implementation mode, each sliding groove 11 is provided with a limiting surface 101 configured to limit a maximum displacement position of a corresponding sliding rail 25.

It is to be understood that, in order to prevent the sliding rails 25 of the wearable portion 2 from getting out of the sliding grooves 11 of the scanner body 1 during use, and exemplarily, the sliding rails 25 are in interference fit with the sliding grooves 11 in one-to-one correspondence with the sliding rails.

In some embodiments, each sliding groove 11 is provided with a guide section 102 which is convenient for a corresponding sliding rail 25 to slide in.

In some embodiments, as shown in FIG. 2 and FIG. 3, the wearable portion 2 is provided with an abutment platform 26. The abutment platform 26 is provided with an abutment plane 261. The abutment plane 261 is configured to abut against an end face 13 of one side, facing the wearable portion 2, of a corresponding connecting portion. The abutment platform 26 enhances the stability of connection of the sliding rail 25 with the siding groove 11, thereby avoiding relative movement between the wearable portion 2 and the scanner body 1 during wear of the user.

In some embodiments, as shown in FIG. 2, the wearable portion 2 includes two adjusting sections. The two adjusting sections 201 are disposed on opposite sides of the contact section, and each of the two adjusting sections 201 connects the contact section with the abutment platform 26. Each abutment platform 26 connects the sliding rail 25 on one side of the wearable portion 2 with the adjusting section 201. The setting number of the adjusting section in the wearable portion 2 is not limited to two. The setting number of the adjusting section in the wearable portion 2 is set according to requirements. In some embodiments, the wearable portion 2 includes only one adjusting section or three or more adjusting sections.

In some embodiments, each adjusting section is not limited to the structure in FIG. 2. The wearable portion 2 includes a connecting section 203 which is not provided with the hole structures 21. The connecting section 202 is provided between each adjusting section and the abutment platform 26, or between each adjusting section 201 and the contact section 202, and can be provided as desired, and no elaboration will be made here.

It is to be understood that the greater the number of hole structures 21 in each adjusting section, the greater the amount of deformation and the better the length adjusting function of the adjusting section.

On the basis of the above-described technical solution, in order to further improve the comfort during use of the user, as an alternative implementation mode, illustration is made with the wearable portion 2 worn at the finger as an example, and the side, facing the wearable portion 2, of the scanner body 1 is provided with an arc-shaped surface 12 matched with the radian of the outer surface of the finger. The wearing space is formed between the arc-shaped surface 12 and the wearable portion 2. The arc direction R of the arc-shaped surface 12 is shown in FIG. 3.

The technical features of the above-described embodiments can be randomly combined, and not all possible combinations of the technical features in the above-described embodiments are described for simplicity of description, however, as long as the combinations of the technical features do not contradict each other, they should be considered to be within the scope of the description of the present specification.

The embodiments described above represent only several implementation modes of the disclosure, and the description thereof is specific and detailed, but should not be construed as limiting the scope of disclosure accordingly. It should be pointed out that those of ordinary skill in the art can also make some modifications and improvements without departing from the concept of the disclosure, and these modifications and improvements all fall within the scope of protection of the disclosure. Accordingly, the scope of the patent of the present application should be subject to the appended claims.

What is claimed is:

1. A wearable scanner, comprising a scanner body and a wearable portion, a wearing space for a user to wear is formed between the scanner body and the wearable portion, wherein the wearable portion comprises at least one adjusting section configured for adjusting a length of the wearable portion; the adjusting section comprises a plurality of hole structures that are disposed in a circumferential direction of the wearable portion, the plurality of hole structures extend in the width direction of the wearable portion, and a plurality of air-permeable grooves formed by hole walls of the plurality of hole structures in a matching manner are provided on a surface of the adjusting section facing the wearing space; the wearing portion further comprises a contact section which is configured to contact a body of a user; the contact section is provided with an adjusting hole which deforms when the wearable portion is stressed; wherein the contact section is provided with only one adjusting hole, and in a length direction of the contact section, a size of the adjusting hole occupies at least two thirds of a length of the contact section.

2. The wearable scanner as claimed in claim 1, wherein the plurality of hole structures are disposed inside the adjusting section, and each of the plurality of hole structures is through hole penetrating through the adjusting section.

3. The wearable scanner as claimed in claim 1, wherein each of the plurality of hole structures is a polygonal hole, and in the length direction of the wearable portion, vertex angles of adjacent polygons are oppositely disposed.

4. The wearable scanner as claimed in claim 1, wherein in a thickness direction of the adjusting section, a size of each of the plurality of hole structures is at least half of a thickness of the adjusting section.

5. The wearable scanner as claimed in claim 1, wherein the contact section one side, facing the scanner body, of the contact section, is provided with a contact surface, and the contact surface is matched with a radian of the body at the wearing position of the user.

6. The wearable scanner as claimed in claim 5, wherein a length direction of a cross section of the adjusting hole is the same as that of the wearable portion.

7. The wearable scanner as claimed in claim 1, wherein the scanner body is connected with the wearable portion through a key groove structure, wherein
one of the scanner body and the wearable portion is provided with two connecting portions oppositely disposed, and each of the two connecting portions is provided with a sliding groove;
the other of the scanner body and the wearable portion is provided with two sliding rails in one-to-one correspondence with sliding grooves of the two connecting portions.

8. The wearable scanner as claimed in claim 7, wherein each sliding groove is provided with a limiting surface configured to limit a maximum displacement position of a corresponding sliding rail.

9. The wearable scanner as claimed in claim 7, wherein each sliding groove is provided with a guide section which is convenient for a corresponding sliding rail to slide in.

10. The wearable scanner as claimed in claim 7, wherein the wearable portion is provided with an abutment platform having an abutment plane for abutment with an end face of one side, facing the wearable portion, of a corresponding connecting portion.

11. The wearable scanner as claimed in claim 10, wherein the wearable portion comprises two adjusting sections disposed on opposite sides of the contact section, and each of the two adjusting sections connects the contact section with the abutment platform.

12. The wearable scanner as claimed in claim 1, wherein a side, facing the wearable portion, of the scanner body is provided with an arc-shaped surface which is matched with a wearing position of the user; and the wearing space is formed between the arc-shaped surface and the wearable portion.

13. The wearable scanner as claimed in claim 12, wherein a material of the wearable portion is an elastic material.

14. The wearable scanner as claimed in claim 1, wherein the scanner body and the wearable portion are detachably connected.

15. The wearable scanner as claimed in claim 1, wherein a material of a shell of the scanner body is plastic.

16. The wearable scanner as claimed in claim 1, wherein a material of the wearable portion is a silicone material or a rubber material.

17. The wearable scanner as claimed in claim 1, wherein the two sliding rails are in interference fit with the sliding grooves of the two connecting portions in one-to-one correspondence with the two sliding rails.

18. The wearable scanner as claimed in claim 1, wherein the wearable portion comprises one adjusting section or three adjusting sections.

19. The wearable scanner as claimed in claim 5, wherein the wearable portion comprises a connecting section, the connecting section is provided between the adjusting section and the contact section.

* * * * *